United States Patent [19]

Mazzola et al.

[11] Patent Number: 5,392,513
[45] Date of Patent: Feb. 28, 1995

[54] STEAMPATH AND PROCESS OF RETROFITTING A NOZZLE THEREOF

[75] Inventors: Mario Mazzola, Ballston Lake; Michael T. Hamlin, Delanson; Richard I. Cromer, Johnstown; John Costantini, Cohoes, all of N.Y.

[73] Assignee: General Electric Co., Schenectady, N.Y.

[21] Appl. No.: 171,032

[22] Filed: Dec. 21, 1993

[51] Int. Cl.⁶ .............................................. B23P 19/04
[52] U.S. Cl. .................................. 29/889.1; 29/889.22; 29/402.13; 415/202; 415/209.2; 228/119
[58] Field of Search ............................. 415/202, 209.2; 29/889.1, 889.22, 402.07, 402.13; 228/119

[56] References Cited

U.S. PATENT DOCUMENTS

| | | | |
|---|---|---|---|
| 1,549,209 | 8/1925 | Nobs | 415/209.2 |
| 3,824,034 | 7/1974 | Leicht | 415/209.2 |
| 5,205,465 | 4/1993 | Bogard et al. | 29/402.13 |
| 5,259,727 | 11/1993 | Quinn | 415/209.2 |

FOREIGN PATENT DOCUMENTS 26713 of 1910 United Kingdom ............. 415/209.2

*Primary Examiner*—Kenneth J. Ramsey
*Attorney, Agent, or Firm*—Nixon & Vanderhye

[57] ABSTRACT

A process for replacing a multi-piece steampath in a nozzle box (12) where, initially, the steampath (22) is secured between upper (24) and lower (26) ring components by means of axially accessible, arcuate welds (36, 38) includes the steps of:
  a) axially machining the arcuate welds (36, 38) so as to permit removal of the steampath (22) in a direction axially away from the nozzle box;
  b) further machining a forward portion of the lower ring component to provide a substantially vertical weld surface; and
  c) securing a one-piece steampath (222) in place by an axially accessible upper weld (236) and a radially accessible lower weld (238).

A nozzle box (212) for a steam turbine includes a torus portion 218 and a bridge ring portion (220), the bridge ring portion including radially inner and outer bridge rings (226, 224) connected by a plurality of bridge elements (234); a one-piece steampath (222) secured between the radially inner and outer bridge rings (226,224), the steampath (222) having integral upper and lower bands (232, 230) connected by integral steampath partitions (234), the steampath being secured to the upper ring (224) by an axially accessible weld (236) and to the lower bridge ring (226) by a radially accessible weld (238).

10 Claims, 4 Drawing Sheets

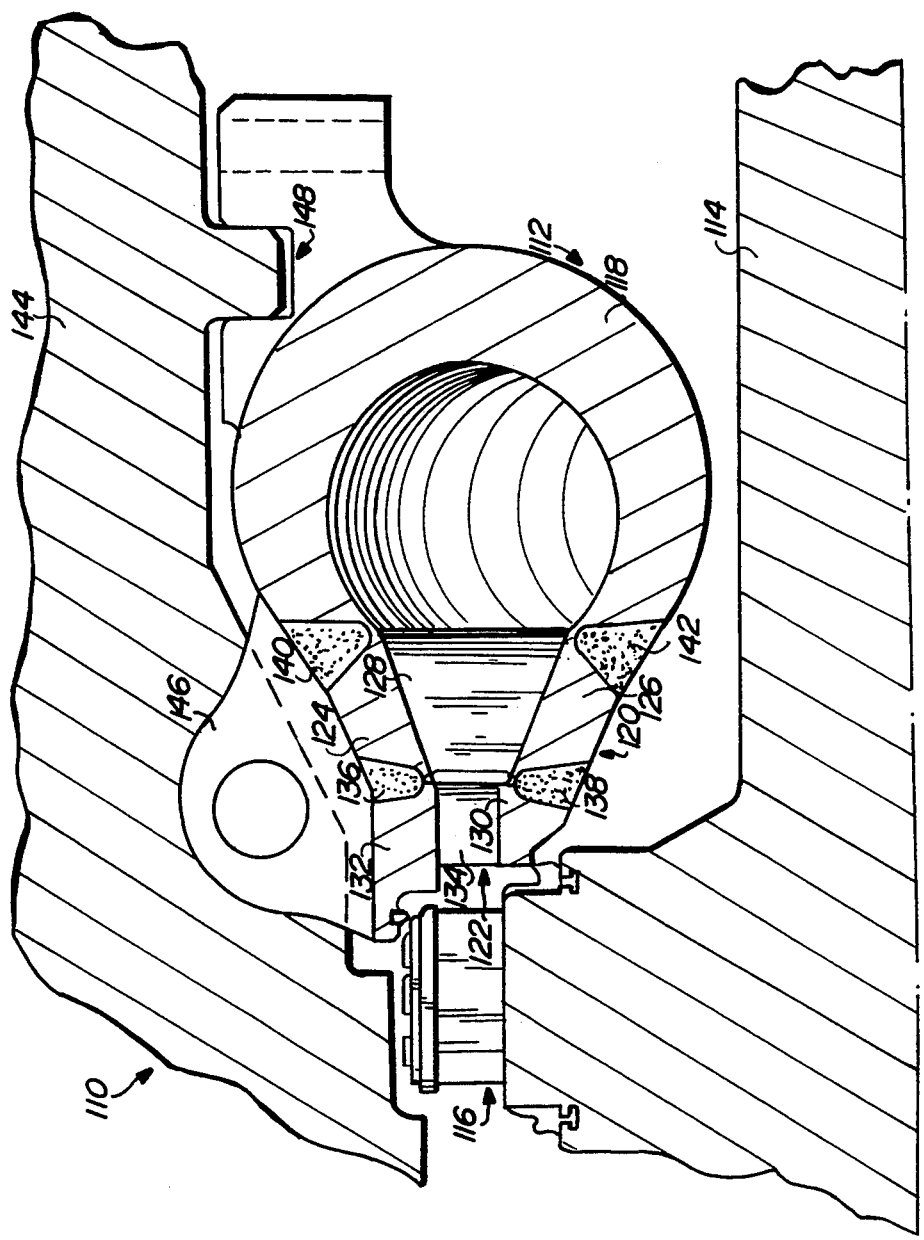

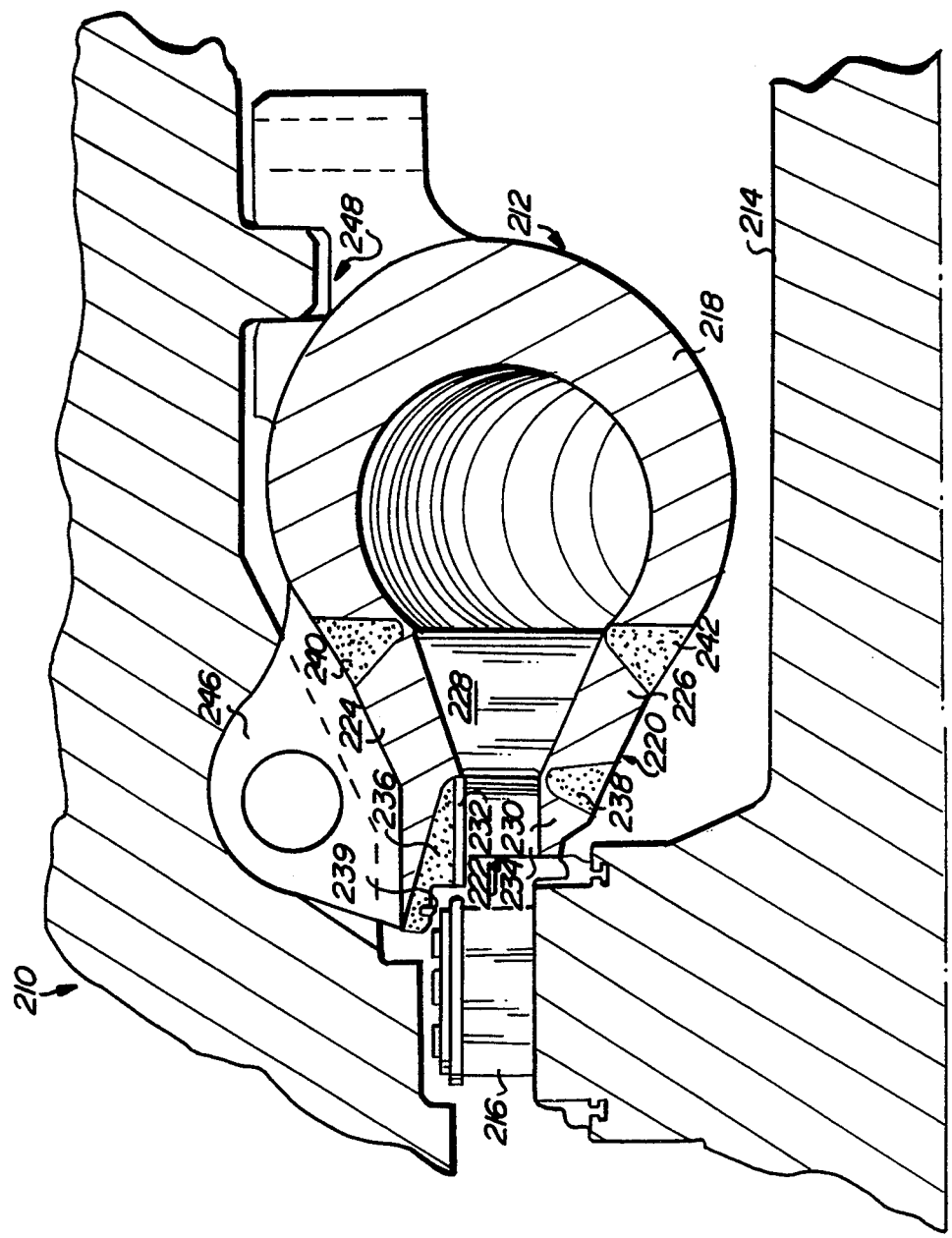

STEAMPATH AND PROCESS OF RETROFITTING A NOZZLE THEREOF

TECHNICAL FIELD

This invention relates to steam turbines in general, and to repair and installation cycles of nozzle box steampaths in the control stage of a steam turbine in particular.

BACKGROUND PRIOR ART

Solid particle erosion of turbine control stages severely impacts the performance of a turbine. To restore performance, procedures have been developed for replacing the eroded steam path of a nozzle box with a modern-profile diffusion-coated erosion resistant steam path. The cycle time needed for replacement, however, requires that the utility have a spare nozzle box, or enough similar nozzle boxes, to justify the purchase of a spare. Without a spare, the savings due to continuous improved performance does not justify the cost of the extended outage time needed to replace the steam path plus the cost of the steam path replacement itself.

In order to provide modern erosion resistant steam paths to "one of a kind" nozzle box owners, the steam path replacement cycle had to be reduced to fit into a normal planned outage.

By way of a more detailed background, and with reference to FIG. 1, the control or first stage 10 of a conventional turbine includes a nozzle box 12 surrounding a rotor 14, the turbine control stage represented by a single bucket 16. The nozzle box 12 in accordance with conventional practice includes, generally, a torus portion 18, a bridge ring assembly 20 and a partition ring assembly 22. In conventional turbines of this type, steam is fed into the torus portion 18 of the nozzle box 12, and directed axially between the outer bridge ring 24 and the inner bridge ring 26, and between a plurality of circumferentially spaced bridge elements 28 (cross-sectional shape illustrated in FIG. 1a) which connect the rings 24 and 26. The steam then flows through the steam path assembly 22, towards the buckets 16. The partition ring assembly in prior turbine constructions consists of radially inner and outer bands 30 and 32 (each formed in 180° segments which, when the turbine is fully assembled, form 360° rings), respectively, which held between them a large number (for example, 100) of vane-shaped partition elements 34 (cross-sectional shape illustrated in FIG. 1b) which serve to direct the steam at a desired angle to the bucket blades. The steampath assembly 22 is welded in place between the upper and lower rings 24, 26 by circumferentially extending welds 36, 38. The rings 24, 26 are, in turn, welded to the torus 18 by means of circumferential welds 40, 42. The nozzle box 12 is supported within the turbine inner shell 44 by a plurality of lugs 46 (one shown) welded to the outside of the torus 18 and bridge ring assembly 20, in an area radially adjacent the steampath assembly 22. The nozzle box 12 is also keyed to the inner shell 44 at 48.

It has not been the practice with the above construction to repair the steampath assembly 22 in situ. Rather, at scheduled maintenance periods, the entire nozzle box 12 would be removed and appropriate repairs made to the partition elements 34 and other components as necessary.

In a later development, as illustrated in FIG. 2 (common reference numerals, but with the prefix "1" added, are used to designate common components), the steampath assembly 122 was manufactured as a one-piece unit including an upper or radially outer band 132 and a lower or radially inner band 130, with integral partitions 134 located therebetween. This new one-piece steampath 122 has superior erosion resistance as compared to the earlier, multi-piece assembly 22 and, in fact, generally does not require repair and/or replacement. Here again, it is to be understood that the one-piece steam path is a 180° segment, and that a pair of such segments are necessary to form a 360° steampath in the final turbine assembly.

This invention relates to the solution to a problem experienced by customers owning earlier turbines having the nozzle box construction shown in FIG. 1, but desirous of having the older multi-piece steampath assembly 22 replaced with the new, one-piece steampath 122 shown in FIG. 2. The prior process for steampath replacement started with removal of the box support lugs 46 to gain access to the original steampath assembly 22. The steampath assembly 22 was then machined off and a transverse weld prep was machined on the inner and outer walls of the box 12. After several intermediate steps, the new erosion-resistant steampath 122 was welded to the bridge ring assembly 20 (or torus 18 if the box was bridgeless) so as to produce the configuration shown in FIG. 2. After the welds were stress-relieved then X-rayed, new lugs (similar to lugs 46) were welded to the box 12. The cycle time to remove, reweld new lugs, stress-relieve the lug weld, and X-ray the lug weld was approximately two weeks.

DISCLOSURE OF THE INVENTION

The invention here relates to a new procedures relating to the attachment of a one-piece, solid particle erosion resistant steampath to either the bridge ring of a nozzle box (or the torus of the box in a bridgeless design), which enables steampath replacement to be carried out quickly during a planned outage.

In an exemplary embodiment of the invention, the original multi-piece steampath assembly 22 is machined axially so as to permit removal of the steampath 22 without having to first remove the box support lugs 46. In the conventional construction shown in FIG. 1, the upper or radially outer bridge ring 24 extended axially to a location downstream of the steampath assembly and, during removal of the steampath in accordance with this invention, the axial extent of the upper bridge ring 24 is maintained. Following removal of the original steampath, the lower or radially inner bridge ring 26 is machined to accommodate a radially accessible weld and the lower band of a one-piece, erosion resistant steampath. The new steampath component is then welded in place to the upper and lower bridge rings, utilizing conventional welding techniques. The upper weld and the lower band of the integral steampath are also machined to accommodate turbine bucket tip seals, and the entire procedure can be accomplished during a planned maintenance outage.

Accordingly, the present invention relates to a process for replacing a multi-piece steampath in a nozzle box where, initially, the steampath is secured between upper and lower ring components by means of axially accessible, arcuate welds, comprising the steps of:
 a) axially machining said arcuate welds so as to permit removal of the steampath in a direction axially away from the nozzle box;

b) further machining the lower ring component to provide a substantially vertical weld surface; and
c) securing a one-piece steampath in place by an axially accessible upper weld and a radially accessible lower weld.

In another aspect of the invention, the above described manner in which a one-piece, erosion resistant steampath is secured to the nozzle box may also be incorporated into the design of new turbines, particularly for those turbines where the nozzle box support lugs are already in place. Thus, the present invention also relates to a nozzle box for a steam turbine comprising a torus portion and a bridge ring portion, the bridge ring portion including radially inner and outer rings connected by a plurality of bridge elements; a one-piece steampath secured between the radially inner and outer rings, the steampath having integral upper and lower bands connected by integral steampath partitions, the steampath being secured to the upper ring by an axially accessible weld and to the lower ring by a radially accessible weld.

The invention as defined herein reduces the cycle time required to replace a nozzle box steam path significantly as compared to prior practice. Other objects and advantages of the invention will become apparent from the detailed description which follows.

BRIEF DESCRIPTION OF THE DRAWINGS

FIG. 2 is a partial cross section of a conventional but updated nozzle box incorporating a one-piece, erosion resistant steampath, and also illustrating the manner in which this newer steampath is welded to the nozzle box bridge rings;

FIG. 3 is a partial cross section of a nozzle box incorporating an erosion resistant steampath in accordance with this invention.

BEST MODE FOR CARRYING OUT THE INVENTION

Figure 1:
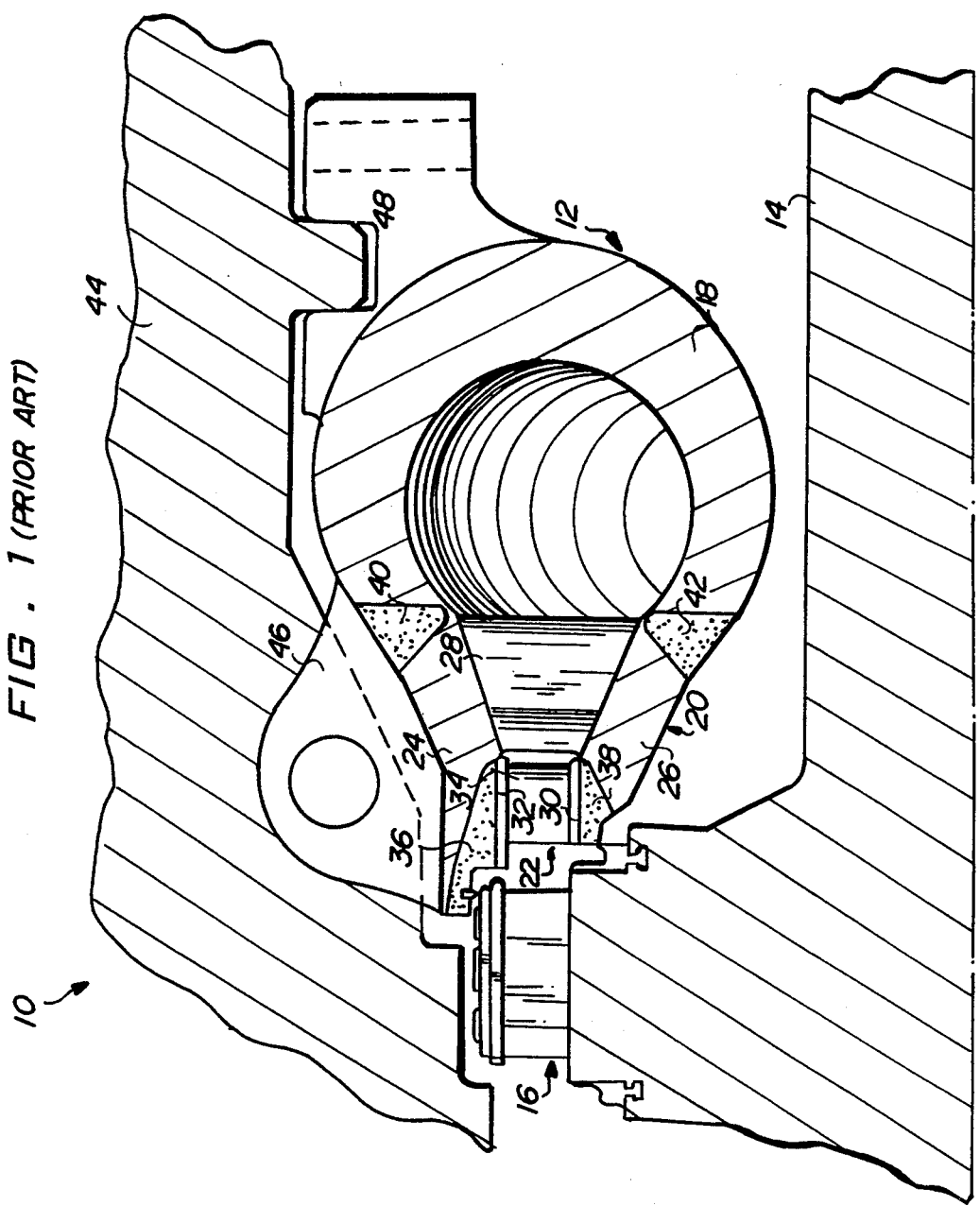
FIG. 1 described above in detail is a partial cross section of a conventional nozzle box construction, illustrating the manner in which a multi-piece steampath is welded to the nozzle box bridge rings.
Figure 1A:
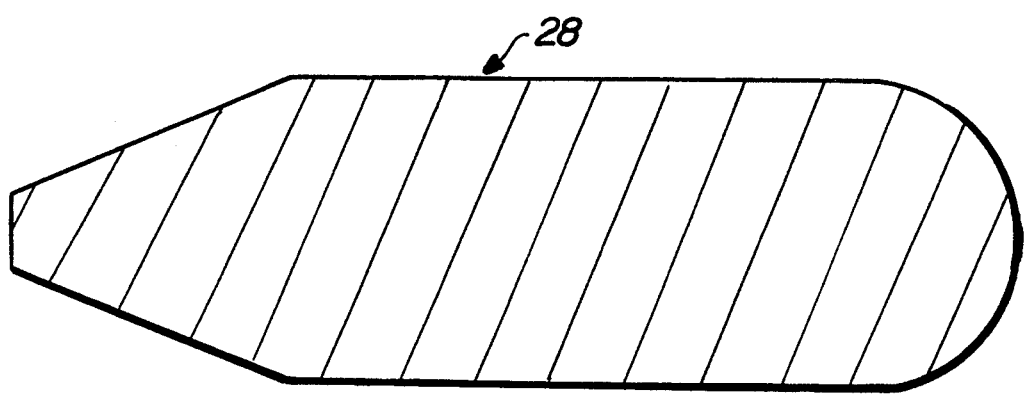
FIG. 1a is a cross-section of a bridge element rotated 90° from the orientation shown in FIG. 1.
Figure 1B:
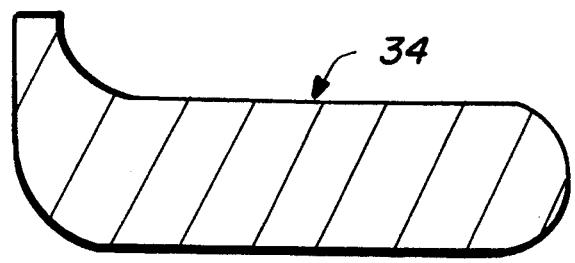
FIG. 1b is a cross-section of a partition ring element rotated 90° from the orientation shown in FIG. 1.

The present invention addresses the manner in which a customer with a nozzle box of the type shown in FIG. 1 can have the steampath 22 replaced with an erosion resistant, one-piece steampath 122 of the type shown in FIG. 2, in a relatively short period of time.

In the exemplary embodiment, it is apparent that in order to modify the FIG. 1 nozzle box to accept a steampath of the type shown at 122 in FIG. 2, it is necessary, as already noted, to remove the plurality of lugs 46 used to secure the nozzle box 12 in place.

In accordance with this invention, the lugs 46 need not be removed. With reference to FIG. 3, where similar reference numerals are used, with a "2" prefix added, to designate common components, and with further reference to FIG. 1, it will be appreciated that the steampath 22 may be removed axially by machining away the weld 36 and a portion of the lower bridge ring 26. Then, by modifying the upper band 132 of the steampath 122 to accommodate the new weld 236 shown in FIG. 3, the steampath 222 may be welded in place in the otherwise conventional set-up of FIGS. 1 and 2, utilizing the axially accessible weld 236 and radially accessible weld 238. Weld 236 is further machined radially to accept arcuate bucket seals 239.

It is another feature of the invention that the FIG. 3 arrangement may be incorporated initially when the nozzle box is constructed in those instances where the lugs 146 are in place prior to mounting the nozzle box 112. In other words, for purposes of initial manufacture, the FIG. 2 arrangement is suitable when the lugs 146 are added after the nozzle box 112, while the FIG. 3 embodiment now permits axial installation of the erosion resistant, one-piece steampath 222 when the lugs 246 are already present.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for replacing a multi-piece steampath in a nozzle box where, initially, the steampath is secured between upper and lower ring components by means of axially accessible, arcuate welds, comprising the steps of:
   a) axially machining said arcuate welds so as to permit removal of said steampath in a direction axially away from said nozzle box;
   b) further machining said lower ring component to provide a substantially vertical weld surface; and
   c) securing a one-piece steampath in place by an axially accessible upper weld and a radially accessible lower weld.

2. The process of claim 1 wherein said one-piece steampath includes upper and lower bands connected by a plurality of steampath partition elements and wherein step c) is carried out by welding said upper and lower bands to said upper and lower rings, respectively.

3. The process of claim 1 wherein said upper and lower welds are each machined to accommodate an arcuate turbine bucket seal.

4. The process of claim 1 wherein, before and after step a), said upper ring projects axially in a steam flow direction beyond said steampath.

5. The process of claim 1 wherein said nozzle box includes a plurality of mounting lugs located radially adjacent said upper weld, and wherein it is not necessary to remove said lugs in the practice of step c).

6. The process of claim 1 wherein said upper and lower ring elements are welded to a torus portion of said nozzle box.

7. A nozzle box for a steam turbine comprising a torus portion and a bridge ring portion, said bridge ring portion including radially inner and outer bridge rings connected by a plurality of bridge elements; a one-piece steampath secured between said radially inner and outer bridge rings, said steampath having integral upper and lower bands connected by integral steampath partitions, said steampath being secured to said upper ring by an axially accessible weld and to said lower ring by a radially accessible weld.

8. The nozzle box of claim 7 wherein a plurality of mounting lugs are secured to said upper ring and to said torus portion at a location radially adjacent said outer ring.

9. The nozzle box of claim 7 wherein said steampath includes upper and lower arcuate bands connected by a plurality of partition elements.

10. The nozzle box of claim 7 wherein said radially outer bridge ring extends axially beyond said upper band in a direction of steam flow.

* * * * *